US007058725B2

(12) United States Patent
Mathew et al.

(10) Patent No.: US 7,058,725 B2
(45) Date of Patent: *Jun. 6, 2006

(54) METHOD AND APPARATUS TO PERFORM NETWORK ROUTING USING MULTIPLE LENGTH TRIE BLOCKS

(75) Inventors: Philip P. Mathew, Santa Clara, CA (US); Ranjeeta Singh, Sunnyvale, CA (US); Harshawardhan Vipat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 10/172,522

(22) Filed: Jun. 13, 2002

(65) Prior Publication Data

US 2004/0006639 A1 Jan. 8, 2004

(51) Int. Cl.
*G06F 15/173* (2006.01)

(52) U.S. Cl. ........................ 709/238; 709/242

(58) Field of Classification Search ........... 709/238, 709/245, 220, 249, 242, 243, 222; 370/254, 370/466, 392, 338, 395, 256, 389; 711/108, 711/216; 703/3; 707/3, 8, 10
See application file for complete search history.

(56) References Cited

U.S. PATENT DOCUMENTS

| | | | | |
|---|---|---|---|---|
| 5,444,851 A * | 8/1995 | Woest | ........................ | 709/222 |
| 5,583,996 A * | 12/1996 | Tsuchiya | .................... | 709/218 |
| 5,721,819 A * | 2/1998 | Galles et al. | ............... | 709/243 |
| 5,761,440 A * | 6/1998 | De Marco et al. | .......... | 709/245 |
| 5,825,768 A * | 10/1998 | Kimbrow et al. | ........... | 370/341 |
| 5,884,297 A * | 3/1999 | Noven | ...................... | 370/395.3 |
| 5,916,306 A * | 6/1999 | Ruiz | .......................... | 709/242 |
| 5,940,396 A | 8/1999 | Rochberger | | |
| 6,011,795 A * | 1/2000 | Varghese et al. | ............ | 370/392 |
| 6,052,683 A * | 4/2000 | Irwin | ............................ | 707/8 |
| 6,115,615 A | 9/2000 | Ota et al. | | |
| 6,212,184 B1 | 4/2001 | Venkatachary et al. | | |
| 6,389,024 B1 * | 5/2002 | Ghai et al. | ............. | 370/395.31 |
| 6,396,842 B1 | 5/2002 | Rochberger | | |
| 6,430,527 B1 * | 8/2002 | Waters et al. | ................... | 703/3 |
| 6,522,632 B1 * | 2/2003 | Waters et al. | ............... | 370/254 |
| 6,567,380 B1 * | 5/2003 | Chen | ......................... | 370/238 |
| 6,581,106 B1 * | 6/2003 | Crescenzi et al. | .......... | 709/242 |
| 6,636,498 B1 * | 10/2003 | Leung | ........................ | 370/338 |
| 6,650,642 B1 * | 11/2003 | Sugai et al. | ................. | 370/392 |
| 6,691,171 B1 * | 2/2004 | Liao | .......................... | 709/245 |
| 6,775,737 B1 * | 8/2004 | Warkhede et al. | .......... | 711/108 |
| 6,798,777 B1 * | 9/2004 | Ferguson et al. | ........... | 370/392 |
| 6,845,091 B1 * | 1/2005 | Ogier et al. | ................. | 370/338 |

(Continued)

FOREIGN PATENT DOCUMENTS

GB 2 350 534 A 11/2000

OTHER PUBLICATIONS

Deterministic IP Table Lookup at Wire Speed, Belenkiy; www.isoc.org/inet99/proceedings/4j/4j_2.htm.*

(Continued)

*Primary Examiner*—Thong Vu
(74) *Attorney, Agent, or Firm*—Kacvinsky LLC

(57) ABSTRACT

A method and apparatus to perform network routing using an improved routing table, search algorithm and update algorithm are described.

31 Claims, 5 Drawing Sheets

U.S. PATENT DOCUMENTS

| | | | |
|---|---|---|---|
| 6,856,991 B1* | 2/2005 | Srivastava | 707/10 |
| 6,880,064 B1* | 4/2005 | Brown | 711/216 |
| 2001/0040895 A1* | 11/2001 | Templin | 370/466 |
| 2002/0080798 A1* | 6/2002 | Hariguchi et al. | 370/395.31 |
| 2002/0087721 A1* | 7/2002 | Sato et al. | 709/238 |
| 2002/0099856 A1* | 7/2002 | Shitama | 709/249 |
| 2003/0005146 A1* | 1/2003 | Miller et al. | 709/238 |
| 2003/0037042 A1* | 2/2003 | Kametani | 707/3 |
| 2003/0220987 A1* | 11/2003 | Pearson | 709/220 |
| 2004/0008634 A1* | 1/2004 | Rangarajan et al. | 370/256 |
| 2004/0013113 A1* | 1/2004 | Singh et al. | 370/389 |

OTHER PUBLICATIONS

Fast Packet Forwarding with Configurable Processor—Michael Ji Tensilica ; www.caip.rutgers.edu/~hji/ip_forward_comm$_{13}$ des_conf.pdf.*

Fast Address Lookups Using Controlled Prefix Expansion—Srinivasan, Varghese (1999) ; www.cs.ucsd.edu/~varghese/PAPERS/TOCS99.pdf.*

IP Route Lookups as String Matching—Donnelly, Deegan (2000) ; www.cl.cam.ac.uk/~and1000/papers/lcn2000_route_lookups_as_string_matching.ps.gz.*

Fast address lookup for Internet routers—Nilsson, Karlsson (1998) (Correct) ; rtm.science.unitn.it/alex98/book/fast-lookup.ps.gz.*

Unbounded length contexts for PPM—Cleary, Teahan (1993) ;www.cs.waikato.ac.nz/~wjt/papers/CJ97.ps.gz.*

IP Lookups Using Multiway and Multicolumn Search—Lampson, Srinivasan, Varghese (1998); www.cs.ucsd.edu/~varghese/PAPERS/ToN99.pdf.*

An Architecture for Monitoring, Visualiization and Control of Gigabit Networks, siesta.cs.wustl.edu/~schmidt/PDF/NMVC. pdf.*

IP Packet Forwarding Lookup; velox.stanford.edu/papers/km_grpmtg_00.pdf.*

IP Lookups using Multiway and Multicolumn Search research.microsoft.com/Lampson/60-IPLookup/Acrobat.pdf.*

Adaptive Algorithms for Cache-efficient Trie Search www.cs.ucsb.edu/~acha/publications/soda98-submitted.html.*

Efficient Peer-To-Peer Lookup Based on a Distributed Trie www.cs.rice.edu/Conferences/IPTPS02/167.pdf.*

An Implementation of Hash Based ATM Router Chip www.ece.uah.edu/~raskovd/pdf/hicss95.pdf.*

* cited by examiner

METHOD AND APPARATUS TO PERFORM NETWORK ROUTING USING MULTIPLE LENGTH TRIE BLOCKS

BACKGROUND

Information may be sent through a network using a network address. For example, a router may receive information that is to be routed to another network device. The router may use a network address, such as a destination address, to search a routing table for the appropriate routing information. This process may also be referred to as a "route lookup." As the size of the network increases, however, a router may have less search time to route the information. The router may also have less time to update the routing table with new routes. Therefore, there may be a need to reduce search and update times for routing information that may result in the faster processing of packets.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to improve the routing of information over a network. More particularly, one embodiment of the invention may improve the search and update efficiency of a network device by using a routing table comprised of trie blocks of varying size, and search and update algorithms designed to utilize the new routing table. The term "routing table" as used herein may refer to a data structure to hold routing information associated with a particular network address. The term "trie block" as used herein may refer to a node of a particular data structure, such as a tree structure. The term "routing information" as used herein may refer to any information for routing data through a network device, such as a port number, an interface number, Dynamic Media Access Controller (DMAC) identifier, Static MAC (SMAC) identifier, Maximum Transmission Unit (MTU), Flags, channel identifiers, queue identifiers and so forth.

For example, one embodiment of the invention may use a combination of 4-bit trie blocks and 8-bit trie blocks to store a network address and associated routing information. Generally, larger trie blocks reduce memory accesses for searching, but they also require more memory and slower update speeds. Conversely, smaller trie blocks increase memory accesses, but require less memory and provide faster update speeds. Consequently, one embodiment of the invention attempts to combine larger and smaller trie blocks in a way that retains the advantages and reduces the associated disadvantages. In other words, this combination may provide the benefits of both large and small trie stride schemes while reducing their potential deficiencies. Consequently, network devices such as routers may perform faster searches and dynamic updates for network addresses and their associated routing information. Accordingly, a user may benefit from improved network products and services.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
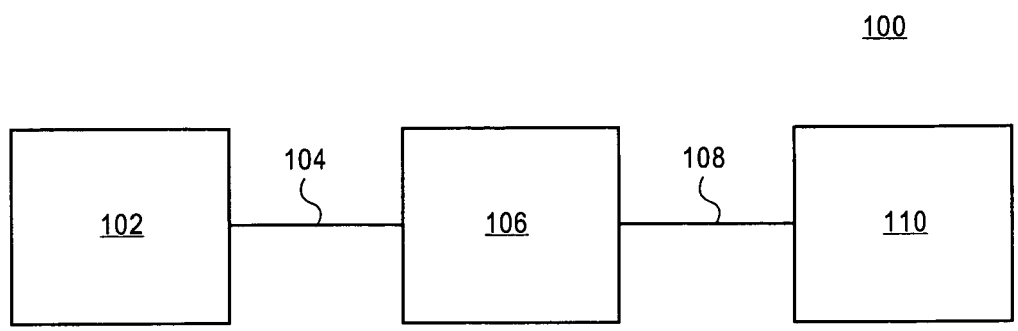
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth.

More particularly, system 100 may comprise a source node 102, intermediate node 106 and destination node 110. Source node 102, intermediate node 106 and destination node 110, may be connected by communications media 104 and 108 as shown. Although FIG. 1 shows only one source node, one intermediate node and one destination node, it can be appreciated that any number of network nodes may be used in system 100 and still fall within the scope of the invention. Furthermore, the terms "connection" and "interconnection," and variations thereof, in this context may refer to physical connections and/or logical connections.

In one embodiment of the invention, system 100 may comprise a packet-switched network. Packet switching in this context may refer to communicating information over a network in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification"). Packets may be addressed using any number of protocols, such as the Internet Protocol Version Four (IPv4) addressing identified by the IP Specification, and the IETF Internet Protocol Version Six (IPv6) draft standard, RFC 2460, dated December 1998 ("IPv6 Specification"), also available from "www.ietf.org."

In one embodiment of the invention, source node 102 may comprise a node that originates a set of information for delivery to destination node 110. Destination node 110 may comprise a node that is the intended recipient of the information. Intermediate node 106 may comprise a node that communicates the information between source node 102 and destination node 110. In some cases, there may be more than one source node, destination node, and/or intermediate node. For example, in a multicast connection there may be multiple destination nodes. In another example, there are frequently multiple intermediate nodes between a source node and destination node. One example of each is shown for purposes of clarity, although the embodiments are not limited in this context. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth.

In general operation, source node 102 may send information to destination node 110 through intermediate node 106 in accordance with the TCP/IP Specification. The source node breaks a set of information into a series of packets. Each packet may contain a portion of the information plus some control information. The control information may assist intermediate nodes in the network to route each packet to the destination node. Source node 102 may send the packets to intermediate node 106. Intermediate node 106 may receive the packets, store them briefly, and pass them to the next intermediate node or destination node 110. Destination node 110 may eventually receive the entire series of packets and may use them to reproduce the original information sent by source node 102.

Figure 2:
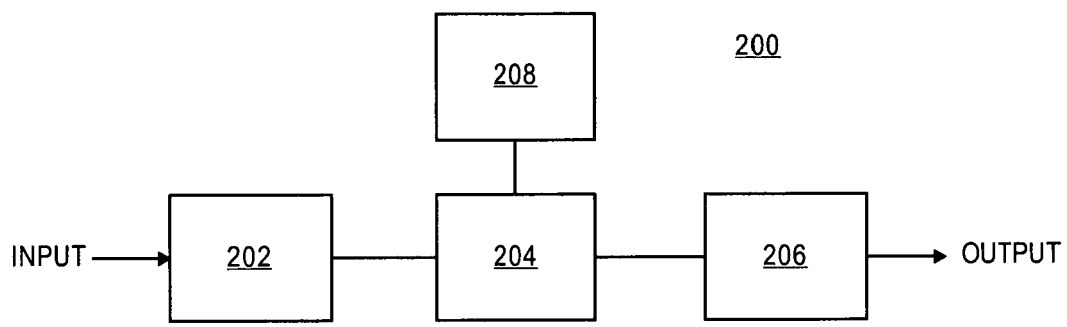
FIG. 2 is a block diagram of a processing system in accordance with one embodiment of the invention.

FIG. 2 illustrates a block diagram of a processing system in accordance with one embodiment of the invention. FIG. 2 may illustrate a processing system 200 that incorporates functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, processing system 200 may comprise a receive interface 202, a search module 204, a transmit interface 206 and an update module 208. Receive interface 202 may receive packets and perform control processing and routing to search module 204. Search module 204 may search a routing table for routing information using control information retrieved from the packets. Transmit interface 206 may communicate the packets to their next destination using the routing information. Update module 208 may update the routing table in accordance with instructions and update information retrieved from special control packets.

More particularly, search module 204 searches a routing table having a unique data structure that is optimized to increase the search and update efficiency of a network device, such as a router. Search module 204 may search the routing table using a search algorithm that is more efficient than conventional search algorithms. For example, several algorithms exist for IPv4/Pv6 Longest Matching Prefix (LPM) lookups. Most of these algorithms, however, build complex data structures in memory to speed up the search. In the absence of memory cache hierarchies, accessing these data structures may slow down the search process substantially. Consequently, the performance of network devices such as routers may be improved by reducing the number of accesses to memory while searching the route table, and in addition, while performing route table updates.

One commonly known IPv6 implementation, found in the Berkeley Software Design (BSD) and Linux kernels, uses a Patricia Tree search algorithm with binary radix tree, or a 1-bit trie. A 1-bit trie is a tree in which each node contains a 0-pointer, a 1-pointer, and possibly a prefix. Individual bits of the prefix determine the node at which the prefix is stored. The search algorithm considers one bit of a destination IP address at a time and traverses the tree based on the value of the bit to find a matching prefix. These implementations may effectively handle prefixes of arbitrary lengths, but their performance degrades as the number of entries increase in the route table. As a result, these implementations may require memory accesses equal to the number of bits in the destination address, e.g., 128 memory accesses for IPv6. This lead to using trees of higher radix—i.e. multi-bit tries.

Using a higher number of bits for a trie may reduce the number of memory accesses but would introduce two new problems. First, it may require more memory per trie structure. Second, it may require a greater number of memory accesses to perform certain adds and deletes. Assuming a 4-bit trie, for example, 16 Static Random Access Memory (SRAM) accesses may be needed to match a typical 64-bit IPv6 prefix. If 8-bit trie blocks were used, the same route lookup would need only 8 SRAM accesses. However, the prefixes having a length that is not a multiple of 8 would require up to 128 SRAM accesses to add/delete a route. Consequently, the size of the trie may partially determine the trade-off between search and update efficiency. Higher trie structures may help speed up the search process but may make the updates expensive for certain route entries.

One embodiment of the invention may solve this trade-off problem by using a combination of tries having varying lengths. For example, in one embodiment of the invention the routing table is made up of 4-bit and 8-bit tries. This may be discussed in further detail with reference to FIG. 3.

Figure 3:
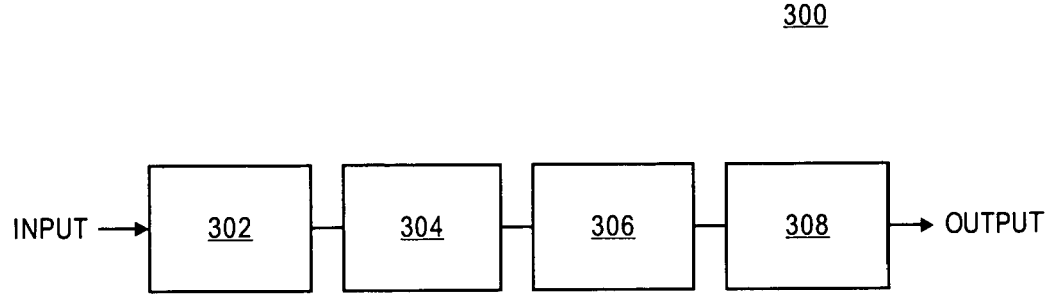
FIG. 3 is a block diagram of a search module in accordance with one embodiment of the invention.

FIG. 3 is a block diagram of a search module in accordance with one embodiment of the invention. FIG. 3 illustrates a search module 300 that may be representative of, for example, search module 204. Search module 300 may comprise an address extraction module 302, a bit extraction module 304, a trie identification module 306 and a route decision module 308. In one embodiment of the invention, address extraction module 302 may extract a network address from the packet. The network address may be, for example, an IP destination address. Bit extraction module 304 may extract bits from the network address. Trie identification module 306 may identify a trie identifier or stride bit for the next trie using the extracted bits. The terms "trie identifier" and "stride bit" as used herein may collectively refer to an identifier to identify the next trie in a data structure. For example, in one embodiment of the invention the trie identifier may be a "0" to represent a 4-bit trie table, or a "1" to represent an 8-bit trie table, although the embodiments are not limited in this respect. Trie identifiers and trie data structures may be discussed in more detail with reference to FIGS. 7 and 8. Route decision module 308 may retrieve the routing information once the routing table has been fully traversed.

In operation, search module 300 may search a routing table having a data structure comprised of 4-bit and 8-bit tries to represent the route entries. The first leading 8 bits of a 128-bit destination IPv6 address may be extracted and used to index into a base 8-bit trie table. Subsequent trie tables, if any, are traversed using either 4 or 8 bit portions of the address depending on next stride-bit in the current trie-entry. This continues until a null next-trie pointer is encountered. While traversing the tries the next hop pointer may be preserved at a fixed location. After the search terminates, this location may contain the pointer to the next hop information.

Figure 4:
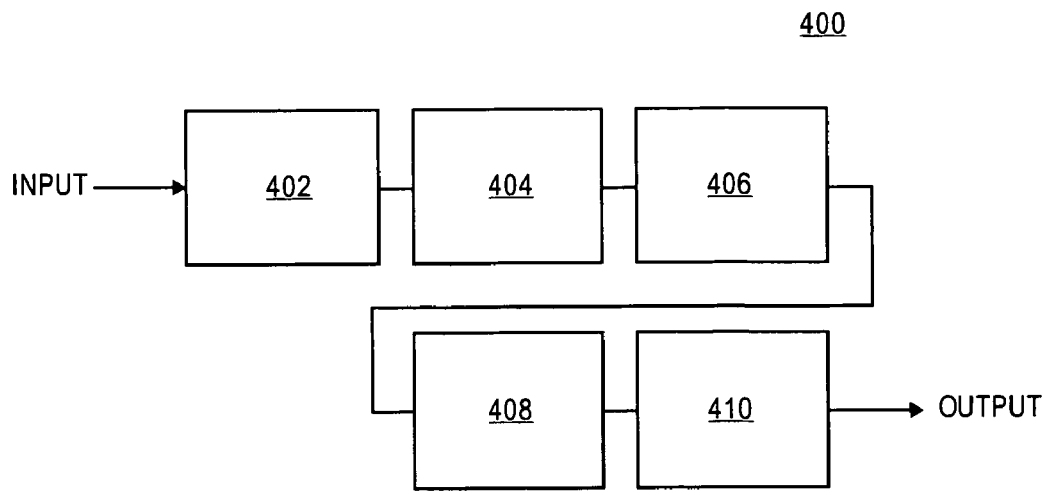
FIG. 4 is a block diagram of an update module in accordance with one embodiment of the invention.

FIG. 4 is a block diagram of an update module in accordance with one embodiment of the invention. FIG. 4 illustrates an update module 400 that may be representative of, for example, update module 208. In one embodiment of the invention, update module 400 may comprise a bit extraction module 402, a trie identification module 404, a trie allocation module 406, a control prefix expansion module 408 and a trie connection module 410. Bit extraction module 402 may extract bits from a network address, such as an IP destination address. Trie identification module 404 may identify a next trie using the extracted bits. Trie allocation module 406 may allocate a new trie based on a status of the next trie. Control prefix expansion module 408 may perform control prefix expansion based on a number of unextracted bits remaining in the network address. The term "control prefix expansion" as used herein may refer to any control prefix expansion algorithm that results in multiple trie entries pointing to the same next hop route entry. Trie connection module 410 may connect the mapped tries.

In operation, update module 400 may update a routing table having a data structure comprised of 4-bit and 8-bit tries to represent the route entries. For each route entry its prefix length may decide the mapping of that address onto the trie structures. For adding a route, 8-bit portions of the prefix address are taken and mapped on to 8-bit trie tables until all the bits of the prefix have been processed, or less than 8-bits remain to be processed. The remaining bits are mapped to one or two 4-bit trie tables. If the number of remaining bits is not a multiple of 4, controlled prefix expansion may be used and multiple trie-entries may be set. While setting up the trie tables the stride-bit in each trie-entry is set or cleared to indicate if the next trie block is a 4-bit or 8-bit trie. The next-hop-pointer in the last trie entry is set to point to routing information necessary for forwarding the packet to the next hop.

The operations of systems 100–400 may be further described with reference to FIGS. 5–10 and accompanying examples. Although some or all of FIGS. 5–10 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 5:
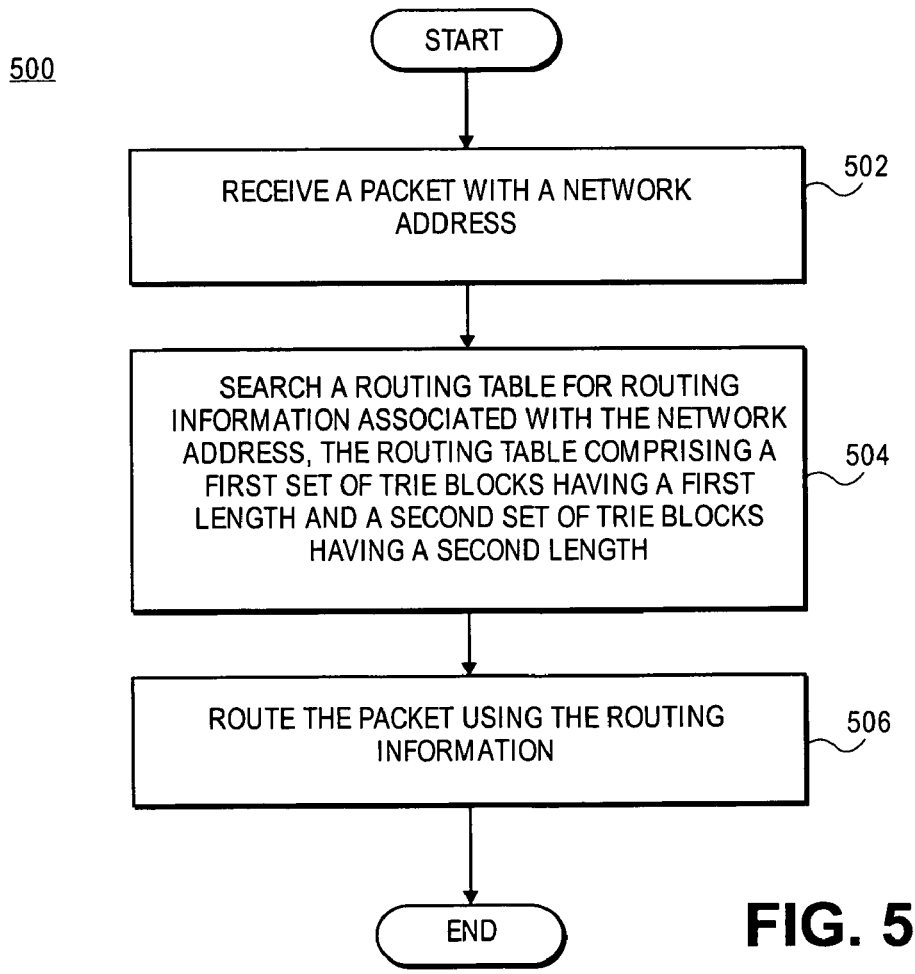
FIG. 5 is a block flow diagram of operations performed by a search module in accordance with one embodiment of the invention.
Figure 6:
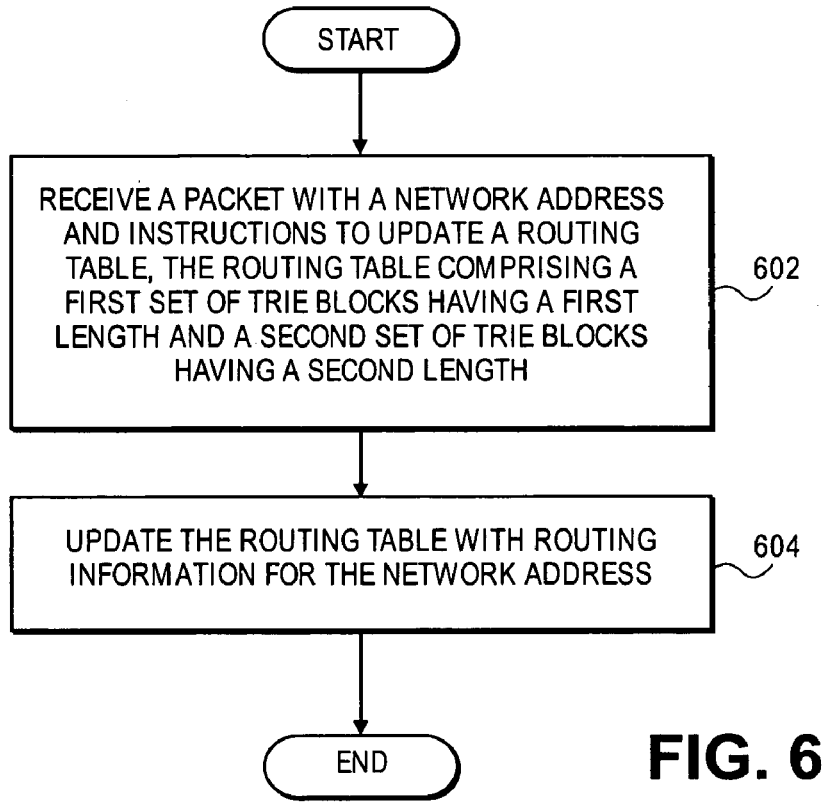
FIG. 6 is a block flow diagram of operations performed by an update module in accordance with one embodiment of the invention.

FIGS. 5 and 6 are block flow diagrams of the operations performed by a search module and an update module, respectively, in accordance with one embodiment of the invention. In one embodiment of the invention, these modules may refer to the software and/or hardware used to implement the functionality for one or more embodiments as described herein. In this embodiment of the invention, these modules may be implemented as part of a processing system, such as processing system 200. It can be appreciated that this functionality, however, may be implemented by any device, or combination of devices, located anywhere in a communication network and still fall within the scope of the invention.

FIG. 5 illustrates a programming logic 500 for a search module in accordance with one embodiment of the invention. As shown in programming logic 500, a packet with a network address may be received at block 502. A routing table may be searched for routing information associated with the network address at block 504. The routing table may comprise, for example, a first set of trie blocks having a first length and a second set of trie blocks having a second length. In one embodiment of the invention, the first length may comprise 8 bits, while the second length may comprise 4 bits, although the embodiments of the invention are not limited in this respect. The routing information may be used to route the packet at block 506.

In one embodiment of the invention, the routing table may be searched for routing information by retrieving a current block of bits from the network address. A trie block associated with the current block of bits may be located. A trie identifier associated with the trie block may be identified. A next block of bits may be retrieved from the network address based on the trie identifier. This process may be repeated until a terminating condition is met. For example, the terminating condition may comprise locating a next hop pointer to the routing information. In another example, the terminating condition may comprise locating a no route or null indicator.

FIG. 6 illustrates a programming logic 600 for an update module in accordance with one embodiment of the invention. As shown in programming logic 600, a packet with a network address may be received at block 602. The packet may include instructions to update a routing table. The routing table may comprise, for example, a first set of trie blocks having a first length and a second set of trie blocks having a second length. For example, the first length may comprise 8-bits and the second length may comprise 4-bits, although the embodiments are not limited in this respect. The routing table may be updated with the routing information for the network address at block 604.

In one embodiment of the invention, the routing table may be updated by determining whether a route exists for updating. A route may be added to the routing table using the network address in accordance with the determination. For example, if the route exists a current block of bits may be retrieved from the network address. A trie block associated with the current block of bits may be located. A trie identifier associated with the trie block may be retrieved. A new trie block may be added to the routing table based on the trie identifier. A next block of bits may be retrieved from the network address based on the trie identifier. This process may be repeated until a terminating condition is met. The mapped trie blocks may then be connected.

In one embodiment of the invention, the terminating condition may comprise determining whether a number of unretrieved bits from said network address is less than said second length. For example, the second length may comprise 4-bits. Controlled prefix expansion may then be performed for the remaining unretrieved bits that are less than 4 bits in length.

In one embodiment of the invention, a route may not exist and a new route may need to be added. A block of the first length may be retrieved from the network address. A new trie block may be added to the routing table for the block of bits of the first length. A trie identifier may be assigned for the new trie block. This process may continue until the number of unretrieved bits from the network address are less than the first length. A block of bits of the second length may then be retrieved from the network address. A new trie block may be added to the routing table for the block of bits of the second length. A trie identifier may be assigned for the new trie block. This process may continue until a terminating condition is met as discussed above. The trie blocks may then be connected.

Figure 7:
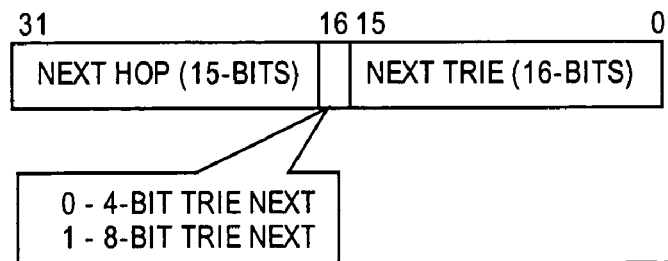
FIG. 7 illustrates a trie block in accordance with one embodiment of the invention.

FIG. 7 illustrates a trie block in accordance with one embodiment of the invention. FIG. 7 may illustrate a trie block 700. In this example, trie block 700 may be an 8-bit trie block, although the same principles may be applied for any size trie block, including a 4-bit trie block. Trie block 700 may comprise, for example, a total of 32 bits, with bits 0–15 representing a pointer to the next trie table, bit 16 representing a trie identifier, and bits 17–31 representing a next hop pointer. In one embodiment of the invention, for example, the trie identifier may be a "0" to represent the next 4-bit trie table, while a "1" may represent the next 8-bit trie table.

Figure 8:
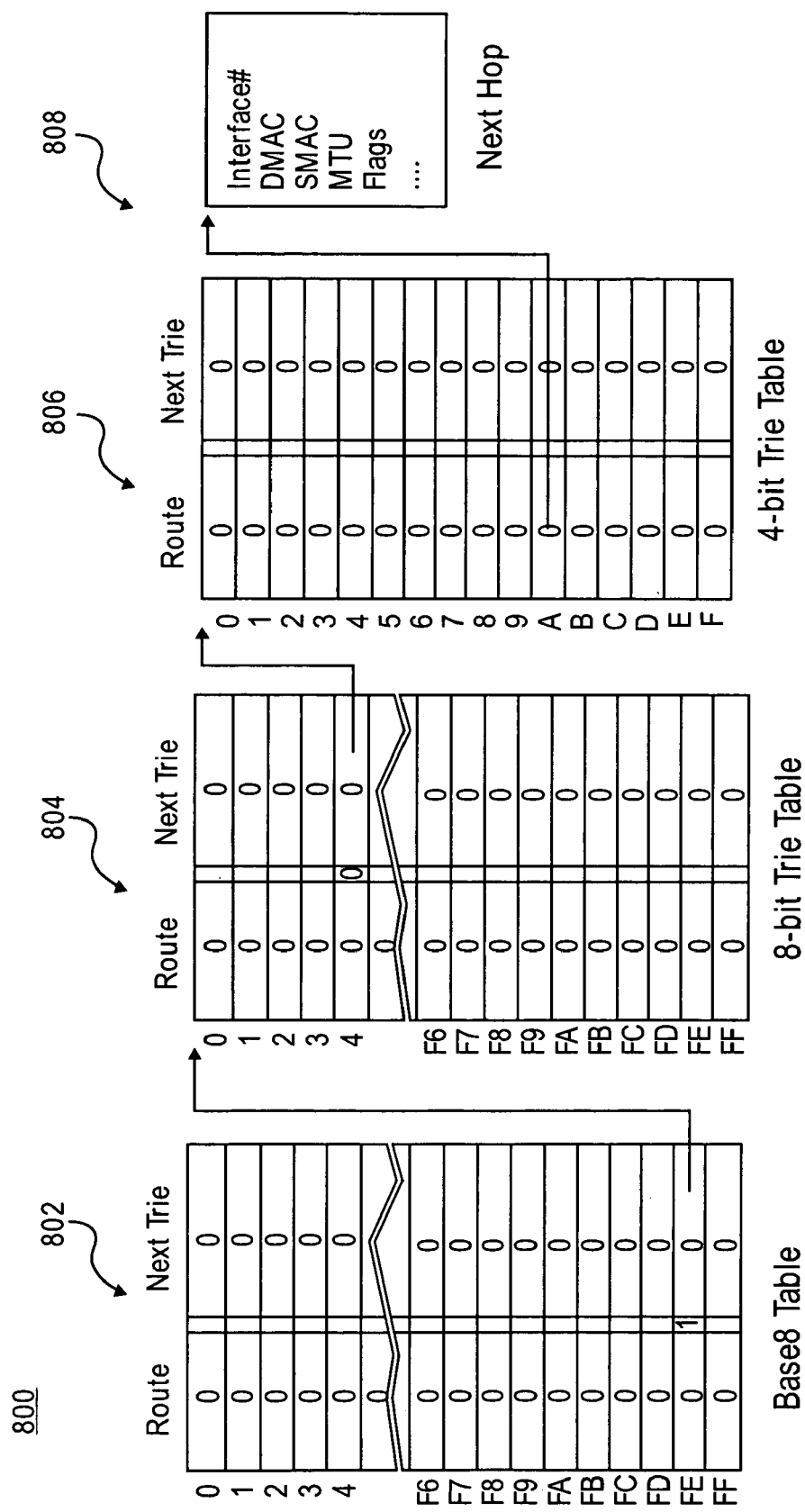
FIG. 8 illustrates a data structure for a routing table in accordance with one embodiment of the invention.

FIG. 8 illustrates a data structure for a routing table in accordance with one embodiment of the invention. FIG. 8 may illustrate a data structure 800 comprising a series of trie tables, with each trie table comprising a plurality of trie blocks. For example, the 8-bit trie blocks may be comprised of trie blocks similar to trie block 700. In one embodiment of the invention, data structure 800 may comprise a first 8-bit trie table 802, a second 8-bit trie table 804, a 4-bit trie table 806, and a next hop entry 808. As stated previously, each trie table may comprise any number of trie blocks. For example, first 8-bit trie table 802 and second 8-bit trie table 804 may both comprise trie blocks 0-FF, as represented in hexadecimal notation. In another example, 4-bit trie table 806 may comprise trie blocks 0-F. Next hop entry 808 may store routing information, such as a port number, an interface number, DMAC, SMAC, MTU, Flags, channel identifier, queue identifier and so forth.

The embodiments shown in FIGS. 1–8 may be further illustrated using an example. A search module, such as search module 300, may search a routing table having a data structure such as data structure 800 by extracting the first leading 8 bits of a network address, such as a 128-bit destination IPv6 address, for example. Search module 300 may then use the extracted bits to index into first 8-bit trie table 802. For example, assume the first 8 extracted bits were "FE". Search module 300 may search first 8-bit trie table 802 for trie block "FE". As indicated in FIG. 8, a null value "0" is found in the "Route" field for trie block FE, and the trie identifier is set to "1." Search module now knows that the next trie table is an 8-bit trie table, and therefore retrieves the next 8 bits from the destination address. The "Next Trie" field in first 8-bit trie table 802 contains a pointer to the next trie table, which in this example is second 8-bit trie table 804. The next 8 retrieved bits indicate trie block "4" of second 8-bit trie table 804. Trie block "4" of second 8-bit trie table 804 contains a null value "0" in the "Route" field, a "0" as the trie identifier, and a pointer to 4-bit trie table 806. Using the new trie identifier, search module 300 retrieves the next 4 bits from the destination address. The next retrieved 4 bits indicate trie block "A" of 4-bit trie block 804. The "Route" field of 4-bit trie table 806 contains a next hop pointer to the routing information stored in next hop entry 808. Search module 300 may then retrieve the routing information.

As shown in the specific example above, subsequent trie tables, if any, are traversed using either 4 or 8 bit portions of the address depending on next stride-bit in the current trie-entry. This continues until a null next-trie pointer is encountered. While traversing the tries the next hop pointer may be preserved at a fixed location. After the search terminates, this location may contain the pointer to the next hop information.

In one embodiment of the invention, search module 300 may be implemented using the following algorithm:

```
// 128 bit destination IPv6 address is an array of 4 long-words (LW)
// unsigned int DestinationIPAddress[4];
    bitsDone = 0;        // how far away we are from the MSB in 128-bit Dest IP
    stride = 8;          // current stride
    bitsToDo = 128;      // how many bits need to be processed
    curPos = Base8Table; // first trie
    do {
        // fetch the correct long-word of destIP
        // based on the current bit position
```

-continued

```
        thisLW = DestinationIpAddress[ bitsDone / 32 ];
        // where we are starting in this long-word
        startBitInLW = bitsDone % 32;
        // how many bit we have left in this long word
        bitsRemainingInLW = 32 − startBitInLW;
        // are the bits remaining in this long-word enough
        // to make a required stride
        if ( bitsRemainingInLW < stride ) {
            // no, stride crossing long-word boundary
            // fetch appropriate bits from two long-words to make a stride
            nextLW = DestinationIpAddress[ ( bitsDone / 32) + 1];
            index = (thisLW << (stride − bitsRemainingInLW)) |         // bits
from first LW
                    (nextLW >> (32 − (stride − bitsRemainingInLW))) &  // bits
from next LW
                    (stride == 8 ? 0xFF : 0xF);                         // mask
        }
        else
            // yes, stride is contained in this long-word
            // fetch the appropriate bits from this long-word to make a nibble
            index = (thisLW >> (bitsRemainingInLW − stride)) &
                    (stride == 8 ? 0xFF : 0xF)
        }
        // get the TrieEntry
        curEntry = *(curpos + index);
        // next trie pointer
        curPos = ( curEntry & 0xFFFF ) * SIZE_OF_TRIE;
        if(curEntry & 0xFFFE0000) {
            lastValidRoute = curEntry >> 17;
        }
        if ((curEntry & 0xFFFF) == 0x0) {
            goto xit;
        }
        // move the position pointer forward
        bitsDone += stride;
        // set next stride as indicated by bit 16
        stride = (currEntry & 0x10000 ? 8 : 4);
    } while (bitsDone < bitsToDo );
    xit:
    if(!lastValidRoute) {
        /* There is no route for this DA */
```

In an example of updating the routing table, the routing process may begin by initiating the search process for the route's destination subnet. For example, the first step in adding a route to the route table is to start the process of a route lookup for the route's destination subnet. This example begins with an 8-bit trie table. Depending on the prefix length specified for the route adds, 8 bits or less may be extracted from the destination address and may be used for a route lookup. Lookup procedure decides how many next bits have to be extracted from the prefix based on a next stride bit (e.g., bit 16) of the current trie entry. If the current trie entry is valid and the next stride bit is 0 then 4 bits may be extracted from the prefix for indexing into the next trie table. If the current trie entry is valid and the next stride bit is 1 then 8 bits may be extracted from the prefix for indexing into the next trie table.

During the lookup, if a null next trie pointer is encountered and there are address bits remaining to be looked up, then further trie blocks may be allocated. Allocation of further trie blocks is based on the remaining bits of the prefix length to be looked up. If the length of the remaining bits to be looked up is exactly divisible by 8, then all the subsequent tries will be 8 bits else all the 8 bit components in the prefix length will be represented as 8 bit tries and the remaining bits of the prefix length will be represented as 4 bit tries. In the final trie block route pointer may be set to point to a newly allocated route, or an existing route with the same next hop. If the last bits of the route mask is less than 4 bits, or greater than 4 bits and less than 8 bits, control prefix expansion may be applied on these bits to add this entry to the appropriate trie table. As mentioned previously, control prefix expansion may result in multiple trie entries pointing to the same next-hop route entry. Specific design implementations should be designed to avoid overwriting previously installed, more specific, routes. The array of masks may be used to determine if the mask of an already installed route is longer than the one currently being added. If the mask of the existing entry is the same as the one being added, the add operation is essentially a replace.

Once the final trie block has been updated with the correct route pointers, the trie blocks are connected in reverse order. This may help prevent a concurrency problem in which a route lookup happening at the same time as a route add would find an incomplete connection of tries and produce unexpected results.

As route pointers and next trie pointers are added to trie blocks, a population statistic may be incremented. This helps in later reclaiming the trie blocks when they are empty.

In one embodiment of the invention, a route add for an update module such as update module 400 may be implemented using the following algorithm:

Dest = destination subnet
Mask = destination mask.
trie currentTrie = 8 bit base trie table of the route table
numnibs = first 8 bits of the Dest.
num1nibs = remaining number of Nibbles of Dest that are of 0xf;

```
prevTrie = currentTrie;
currentTrie = currentTrie->subTrie(numnibs)
if (currentTrie == NULL)
{
   if (num1nibs == 0)
   {
      set currentMaskNib
      currentNib = Next Nibble of the Dest;
      currentTrie = NewTrie4( ); // Create a 4 bit trie table.
      prevTrie.NextTrieSize = 0;
      numRouteEntries = 16 − currentMaskNib;
   }
}
if (num1nibs > 0)
{
   for (i = 0; i<num1nibs; i++)
   {
      if   (currentTrie == NULL)
      {
         if ((num1nibs − i) > 1)
         {
            currentTrie = NewTrie8( ); // Create an 8 bit trie table.
            currentNib = Next 8 bits of the Dest;
            currentMaskNib = set currentMaskNib;
            prevTrie.NextTrieSize = 1;
            numRouteEntries = 256 − currentMaskNib;
            i++;
         }
         else if((num1nibs − i) == 1)
         {
            currentTrie = NewTrie4( ); // Create a 4 bit trie table.
            currentNib = Next Nibble of the Dest;
            currentMaskNib = set currentMaskNib;
            prevTrie.NextTrieSize = 0;
            numRouteEntries = 16 − currentMaskNib;
         }
      }
      else
      {
         if (prevTrie.NextTrieSize == 0)
         {
            currentNib = Next Nibble of the Dest;
            currentMaskNib = set currentMaskNib;
            numRouteEntries = 16 − currentMaskNib;
         }
         else
         {
            if ((num1nibs − i) > 1)
            {
               currentNib = Next 8 bits of the Dest;
               currentMaskNib = set currentMaskNib;
               numRouteEntries = − currentMaskNib;
               numRouteEntries = 256 − currentMaskNib;
               i++;
            }
            else
            {
               CurrentMaskNib = set currentMaskNib;
               currentNib = Remaining bits of Dest;
               numRouteEntries = 256 − currentMaskNib;
               break;
            }
         }
         prevTrie = currentTrie;
         currentTrie = currentTrie->SubTrie(currentNib);
      }
   }
}
newRoute = new Route( );
if (currentTrie == NULL) currentTrie = prevTrie;
startEntry = currentNib & currentMaskNib;
for (i = 0; i < numRouteEntries;i++) {
   if (currentTrie->mask[startEntry + i] < currentMaskNib) {
      CurrentTrie->SetSubRoute(startEntry + i, newRoute);
   }
}
currentTrie->population ++;
connect new tries in the reverse order;
Adjust the population appropriately;
```

The process for deleting a route from the route table may be accomplished by first performing a lookup for the route's destination subnet. If this route is not found, then the route delete may fail. If this route is found, then it may be deleted. In the final trie block, the prefix data structures may be used to determine if there is a less-specific route installed that covers the route being deleted. If there is, this next-hop route pointer may be used to replace the next-hop route pointer being deleted. If there is not a matching less-specific route, the next-hop route pointer for the route being deleted may be set to null.

If a route is successfully deleted from the final trie, the trie's population statistic may be decremented. If the new population is zero, the trie may be deleted and removed from its parent trie, decrementing its population statistic, and so forth. This allows for trie blocks to be reclaimed.

In one embodiment of the invention, a route delete for an update module such as update module 400 may be implemented using the following algorithm:

```
Dest = destination subnet
Mask = destination mask.
trie currentTrie = 8 bit base trie table of the route table
numnibs = first 8 bits of the Dest.
num1nibs = remaining number of Nibbles of Dest that are of 0×f;
prevTrie = currentTrie;
currentTrie = currentTrie->subTrie(numnibs)
if (currentTrie == NULL)
{
   if (num1nibs == 0)
   {
      set currentMaskNib
      currentNib = Next Nibble of the Dest;
      currentTrie = NewTrie4( ); // Create a 4 bit trie table.
      prevTrie.NextTrieSize = 0;
      numRouteEntries = 16 − currentMaskNib;
   }
}
if (num1nibs > 0)
{
   for (i = 0; i<num1nibs; i++)
   {
      if (currentTrie == NULL)
      {
         throw exception;
      }
      else
      {
         if (prevTrie.NextTrieSize == 0)
         {
            currentNib = Next Nibble of the Dest;
            currentMaskNib = Set currentMaskNib;
            numRouteEntries = 16 − currentMaskNib;
         }
         else
         {
            if ((num1nibs − i) > 1)
            {
               currentNib = Next 8 bits of the Dest;
               currentMaskNib = Set currentMaskNib;
               numRouteEntries = − currentMaskNib;
               numRouteEntries = 256 − currentMaskNib;
               i++
            }
            else
            {
               CurrentMaskNib = set currentMaskNib;
               currentNib = Remaining bits of Dest;
               numRouteEntries = 256 − currentMaskNib;
               break;
            }
         }
      }
      prevTrie = currentTrie;
      currentTrie = currentTrie->SubTrie(currentNib);
```

```
        }
    }
    startEntry = currentNib & currentMaskNib;
    if (currentTrie == NULL) currentTrie = prevTrie;
    for (i = 0; i < numRouteEntries;i++) {
        newRoute = find less specific route using the prefix structures.
        if (currentTrie->mask[startEntry + i] == currentMaskNib) {
            CurrentTrie->SetSubRoute(startEntry + i, newRoute);
        }
    }
    currentTrie->population --;
Remove empty tries.
```

Figure 9:
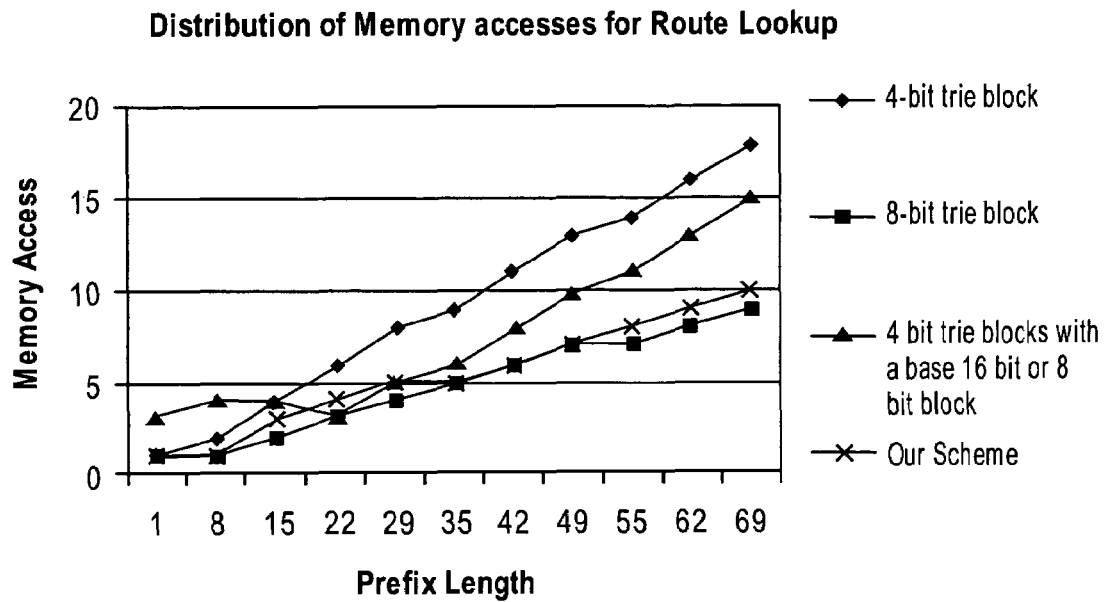
FIG. 9 is a first graph illustrating performance improvements in accordance with one embodiment of the invention.

FIG. 9 is a first graph illustrating performance improvements in accordance with one embodiment of the invention. FIG. 9 illustrates a graph that plots the number of memory accesses required for different operations against prefix lengths in the range of 1 to 64. More particularly, FIG. 9 illustrates a graph showing prefix lengths on the X-axis and the number of memory accesses required to do a lookup on that prefix on the Y-axis. This graph indicates that the lookup performance of our scheme is close to the lookup performance of 8-bit trie blocks scheme, which typically has the least number of memory accesses.

Figure 10:
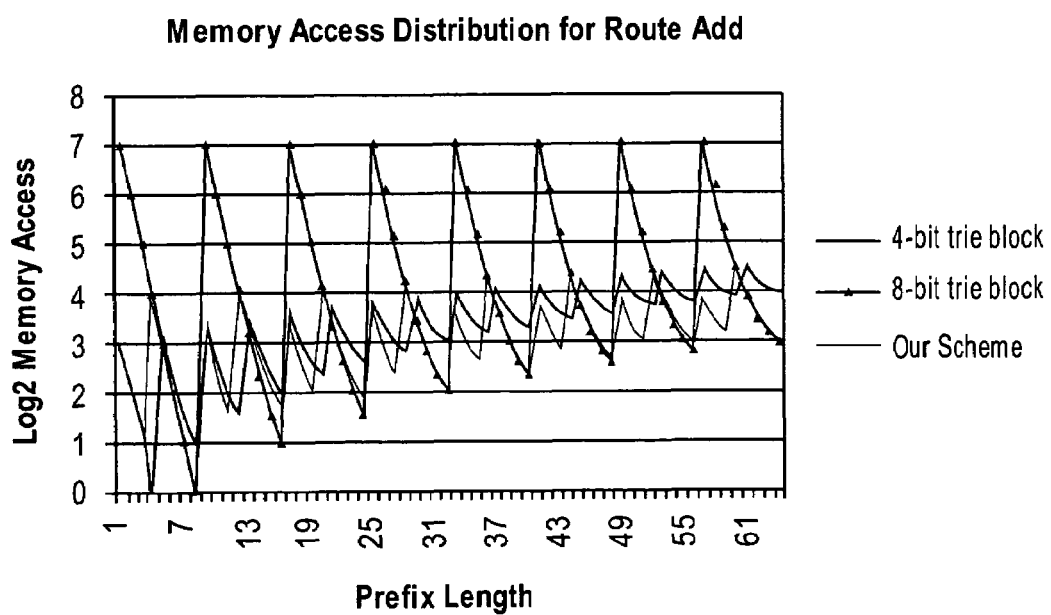
FIG. 10 is a second graph illustrating performance improvements in accordance with one embodiment of the invention.

FIG. 10 is a second graph illustrating performance improvements in accordance with one embodiment of the invention. FIG. 10 illustrates a graph showing the prefix lengths on the X-axis and log of number of memory accesses required to add a route of that prefix length on Y-axis. This graph indicates that the update efficiency of this embodiment is as good as that of a 4-bit trie scheme, and in some cases, even better.

The graphs shown in FIGS. 9 and 10 help demonstrate that the lookup performance of this embodiment is close to the 8-bit trie scheme while the update performance is close to the 4-bit trie scheme. Accordingly, this embodiment promotes the benefits of both 4-bit and 8-bit trie schemes while reducing the associated disadvantages.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to perform network routing, comprising:
   receiving a packet with a network address;
   searching a routing table for routing information associated with said network address, said routing table comprising a first table comprising a first set of trie blocks having a first length, a second table comprising a second set of trie blocks having a second length, and a trie identifier to determine a next block of bits to retrieve from said network address;
   retrieving said next block of bits from said network address based on said trie identifier; and
   routing said packet using said routing information.

2. The method of claim 1, wherein said first length comprises 8 bits.

3. The method of claim 1, wherein said second length comprises 4 bits.

4. The method of claim 1, wherein said searching comprises:
   a) retrieving a current block of bits from said network address;
   b) locating a trie block associated with said current block of bits;
   c) retrieving said trie identifier associated with said trie block;
   d) repeating a)–c) until a terminating condition is met.

5. The method of claim 4, wherein said terminating condition comprises locating a next hop pointer to said routing information.

6. The method of claim 4, wherein said terminating condition comprises locating a no route indicator.

7. A method to update a routing table, comprising:
   receiving a packet with a network address and instructions to update a routing table, said routing table comprising a first table comprising a first set of trie blocks having a first length, a second table comprising a second set of trie blocks having a second length, and a trie identifier to determine a next block of bits to retrieve from said network address;
   retrieving said next block of bits from said network address based on said trie identifier; and
   updating said routing table with routing information for said network address.

8. The method of claim 7, wherein said updating comprises:
   determining whether a route exists for updating;
   adding said route using said network address in accordance with said determination.

9. The method of claim 8, wherein said route exists and said adding comprises:
   a) retrieving a current block of bits from said network address;
   b) locating a trie block associated with said current block of bits;
   c) retrieving said trie identifier associated with said trie block;
   d) adding a new trie block to said routing table based on said trie identifier;
   e) repeating a)–d) until a terminating condition is met; and
   f) connecting said trie blocks.

10. The method of claim 9, wherein said terminating condition comprises: determining whether a number of unretrieved bits from said network address is less than said first length; and performing controlled prefix expansion for said unretrieved bits.

11. The method of claim 8, wherein said route does not exist and said adding comprises:
   a) retrieving a block of bits of said first length from said network address;
   b) adding a new trie block to said routing table for said block of bits of said first length;
   c) assigning a trie identifier for said new trie block;
   d) repeating a)–c) until a number of unretrieved bits is less than said first length;
   e) retrieving a block of bits of said second length from said network address;
   f) adding a new trie block to said routing table for said block of bits of said second length;
   g) assigning a trie identifier for said new trie block;
   h) repeating e)–g) until a terminating condition is met; and
   i) connecting said trie blocks.

12. The method of claim 11, wherein said terminating condition comprises: determining whether a number of unretrieved bits from said network address is less than said second length; and performing controlled prefix expansion for said unretrieved bits.

13. The method of claim 7, wherein said first length comprises 8 bits and said second length comprises 4 bits.

14. A routing apparatus, comprising:
a receive interface to receive a packet with a network address;
a search module to search a routing table for routing information, said routing table comprising a first table comprising a first set of trie blocks of a first length, a second table comprising a second set of trie blocks of a second length, and a trie identifier to determine a next block of bits to retrieve from said network address and to retrieve said next block of bits from said network address based on said trie identifier; and
a transmit interface to transmit said packet using said routing information.

15. The routing apparatus of claim 14, wherein said search module comprises:
an address extraction module to extract said network address from said packet;
a bit extraction module to extract bits from said network address;
a trie identification module to identify a next trie using said extracted bits; and
a route decision module to retrieve said routing information.

16. The routing apparatus of claim 14, further comprising an update module to update said routing table with routing information.

17. The routing apparatus of claim 16, wherein said update module comprises:
a bit extraction module to extract bits from a network address;
a trie identification module to identify a next trie using said extracted bits;
a trie allocation module to allocate a new trie based on a status of said next trie;
a control prefix expansion module to perform control prefix expansion based on a number of unextracted bits remaining in said network address; and
a trie connection module to connect said mapped tries.

18. A system to manage routing in a network, comprising:
a source node to send a packet using a network address;
a destination node corresponding to said network address to receive said packet; and
an intermediate node to route said packet between said source node and said destination node, said intermediate node having a routing apparatus to route said packet using a routing table comprising a first table comprising a first set of trie blocks of a first length, a second table comprising a second set of trie blocks of a second length, and a trie identifier to determine a next block of bits to retrieve from said network address and to retrieve said next block of bits from said network address based on said trie identifier.

19. The system of claim 18, wherein said second length comprises fewer bits than said first length.

20. The system of claim 18, wherein said routing apparatus comprises:
a receive interface to receive a packet with a network address;
a search module to search a routing table for routing information, said routing table comprising a first set of trie blocks of a first length and a second set of trie blocks of a second length; and
a transmit interface to transmit said packet using said routing information.

21. The system of claim 18, wherein said routing apparatus comprises:
a bit extraction module to extract bits from a network address;
a trie identification module to identify a next trie using said extracted bits;
a trie allocation module to allocate a new trie based on a status of said next trie;
a control prefix expansion module to perform control prefix expansion based on a number of unextracted bits remaining in said network address; and
a trie connection module to connect said mapped tries.

22. An article of manufacture comprising:
a storage medium;
said storage medium including stored instructions that, when executed by a processor, result in receiving a packet with a network address, searching a routing table for routing information associated with said network address, said routing table comprising a first table comprising a first set of trie blocks having a first length, a second table comprising a second set of trie blocks having a second length, and a trie identifier to determine a next block of bits to retrieve from said network address, retrieving said next block of bits from said network address based on said trie identifier, and routing said packet using said routing information.

23. The article of manufacture of claim 22, wherein the stored instructions, when executed by a processor, further result in said searching by (a) retrieving a current block of bits from said network address, (b) locating a trie block associated with said current block of bits, (c) retrieving said trie identifier associated with said trie block, and (d) repeating (a)–(c) until a terminating condition is met.

24. The article of manufacture of claim 23, wherein the stored instructions, when executed by a processor, further result in a terminating condition that comprises locating a next hop pointer to said routing information.

25. The article of manufacture of claim 23, wherein the stored instructions, when executed by a processor, further result in a terminating condition that comprises locating a no route indicator.

26. An article of manufacture comprising:
a storage medium;
said storage medium including stored instructions that, when executed by a processor, result in receiving a packet with a network address and instructions to update a routing table, said routing table comprising a first table comprising a first set of trie blocks having a first length, a second table comprising a second set of trie blocks having a second length, and a trie identifier to determine a next block of bits to retrieve from said network address, retrieving said next block of bits from said network address based on said trie identifier; and updating said routing table with routing information for said network address.

27. The article of manufacture of claim 26, wherein the stored instructions, when executed by a processor, further result in said updating by determining whether a route exists for updating, and adding said route using said network address in accordance with said determination.

28. The article of manufacture of claim 27, wherein the stored instructions, when executed by a processor, further result in determining said route exists and said adding comprises (a) retrieving a current block of bits from said network address, (b) locating said trie block associated with said current block of bits, (c) retrieving a trie identifier associated with said trie block, (d) adding a new tile block to said routing table based on said tile identifier, (e) repeating (a)–(e) until a terminating condition is met, (f) and connecting said trie blocks.

29. The article of manufacture of claim 28, wherein the stored instructions, when executed by a processor, further result in said terminating condition that comprises determining whether a number of unretrieved bits from said network address is less than said first length, and performing controlled prefix expansion for said unretrieved bits.

30. The article of manufacture of claim 27, wherein the stored instructions, when executed by a processor, further result in determining said route does not exist and said adding comprises (a) retrieving a block of bits of said first length from said network address, (b) adding a new trie block to said routing table for said block of bits of said first length, (c) assigning a trie identifier for said new trie block, (d) repeating (a)–(c) until a number of unretrieved bits is less than said first length, (e) retrieving a block of bits of said second length from said network address, (f) adding a new trie block to said routing table for said block of bits of said second length, (g) assigning a trie identifier for said new trie block, (h) repeating (e)–(g) until a terminating condition is met, and (i) connecting said trie blocks.

31. The article of manufacture of claim 30, wherein the stored instructions, when executed by a processor, further result in said terminating condition that comprises determining whether a number of unretrieved bits from said network address is less than said second length, and performing controlled prefix expansion for said unretrieved bits.

* * * * *

UNITED STATES PATENT AND TRADEMARK OFFICE
CERTIFICATE OF CORRECTION

| | | |
|---|---|---|
| PATENT NO. | : 7,058,725 B2 | Page 1 of 1 |
| APPLICATION NO. | : 10/172522 | |
| DATED | : June 6, 2006 | |
| INVENTOR(S) | : Mathew et al. | |

It is certified that error appears in the above-identified patent and that said Letters Patent is hereby corrected as shown below:

On the Title page, Item (56), under "U.S. Patent Documents", in column 2, line 21, after "6,845,091" delete "B1" and insert -- B2 --, therefor.

In column 16, line 67, in Claim 28, delete "tile" and insert -- trie --, therefor.

In column 17, line 1, in Claim 28, delete "tile" and insert -- trie --, therefor.

In column 17, line 2, in Claim 28, delete "(a)-(e)" and insert -- (a)-(d) --, therefor.

Signed and Sealed this

Second Day of October, 2007

JON W. DUDAS
*Director of the United States Patent and Trademark Office*